Figure 1:
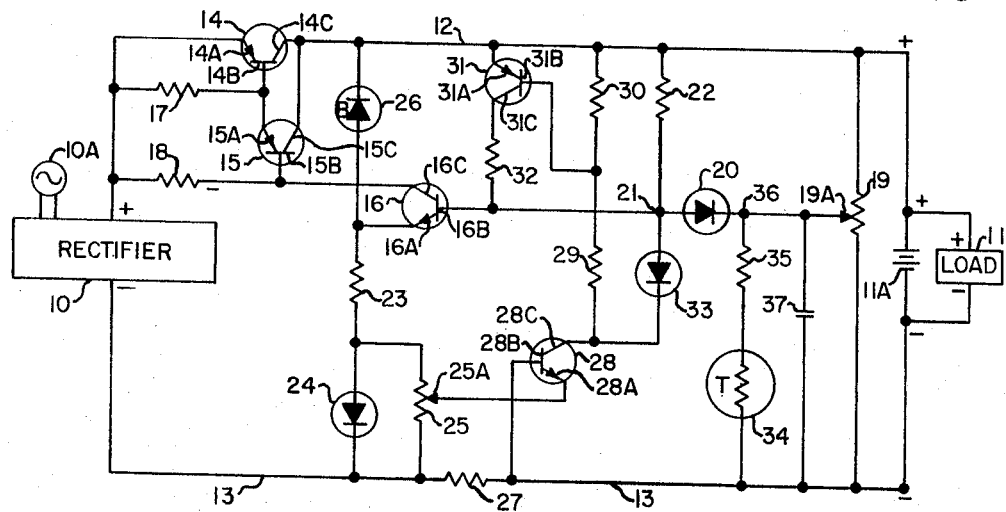

Feb. 21, 1967   H. M. HUGE ET AL   3,305,725
FULL CHARGE REGULATOR CIRCUITRY
Filed Dec. 9, 1963   3 Sheets-Sheet 1

INVENTORS
HENRY M. HUGE
STEPHEN L. MERKEL
BY John Howard Smith
ATTY.

INVENTORS
HENRY M. HUGE
STEPHEN L. MERKEL
BY John Horsay Smith
ATTY.

United States Patent Office 3,305,725
Patented Feb. 21, 1967

3,305,725
FULL CHARGE REGULATOR CIRCUITRY
Henry M. Huge, Bay Village, and Stephen L. Merkel, Cleveland, Ohio, assignors to Lorain Products Corporation, a corporation of Ohio
Filed Dec. 9, 1963, Ser. No. 329,179
13 Claims. (Cl. 307—46)

This invention relates to a voltage regulating circuit for a battery charger and is directed more particularly to circuitry adapted to charge a wet cell battery to full capacity.

In a number of industries where it is imperative that equipment be maintained in operating condition despite failure of A.-C. line power, a battery of wet cells is often used for reserve or standby power. The equipment which comprises the load is connected across the battery and a battery rectifier-charger operating from A.-C. line power is also connected across the battery.

With the battery in fully charged condition, the current requirements of the load are supplied from the rectifier-charger while A.-C. line power is available. However, in the event of A.-C. line power failure, the load will draw current from the battery and the battery may become discharged.

Since a discharged battery will draw a very high current from the charger when A.-C. line power is restored, it will be seen that in order to protect the charger from damage, circuitry which limits the charger output current must be provided.

In addition, when the battery is fully charged, the voltage applied to it by the charger must be closely regulated to a value designated as float voltage. At float voltage the battery is maintained in a fully charged condition and draws only a trickle current which does not overheat or damage the battery.

It has been found that with ordinary charging methods, such as described above, certain types of batteries such as the nickel-cadmium and lead-acid types do not charge to their full ampere hour capacity. In the case of a nickel-cadmium battery, for instance, the maximum voltage applied to the battery by the charger will be the float voltage value of 1.4 volts per cell. This is insufficient to fully charge the nickel-cadmium battery because of the inherent characteristics of such batteries.

If the battery charger is adjusted to supply a voltage greater than the float value in order to attain a fully charged state of the battery, there will be gassing and excessive water loss after it has been charged to full capacity unless the charger is readjusted to supply float voltage. Consequently it is desirable that some circuitry be provided whereby, as the battery voltage reaches float value during the charging process, the charger voltage continues to increase to a greater than float value which will be sufficient to charge the battery to its maximum ampere hour capacity. In addition, after the battery has been fully charged, the circuitry must again supply float voltage to the battery and the load.

This is accomplished, in the circuitry we have provided, by a two stage voltage pattern. In one stage, a full charge voltage peak, which is greater than float voltage, is effective only until the battery is fully charged. During the second stage, the battery is maintained at normal float voltage while the charger is supplying the load during normal operation.

It will be seen that this two stage voltage pattern is particularly advantageous for charging batteries at remote unattended locations. With such unattended battery usage, excessive water loss and the resulting damage can be avoided by precisely controlling the full charge voltage peak and the batteries may be fully charged by the use of the circuit shown herein without requiring constant attendance of maintenance personnel.

Accordingly, it is an object of the invention to provide circuitry which will fully charge a battery to overcome the difficulties enumerated above.

It is another object of the invention to provide circuitry which will fully charge nickel-cadmium or lead-acid batteries without causing excessive water loss and gassing.

It is another object of the invention to provide circuitry which supplies the necessary excess voltage to fully charge a battery of the type described above and which returns the voltage to float value as soon as the battery is fully charged.

It is another object of the invention to provide fully transistorized circuitry requiring no magnetic amplifiers and which will fully charge a battery having the above desired characteristics.

It is a further object of the invention to provide circuitry having an output voltage regulation curve characterized as being flat or constant under normal load conditions, as current limiting or constant current under excessive load conditions or discharged battery conditions and as having what may be termed a full charge voltage peak, which is above float value, between maximum rated output current and the constant current limit value, the latter being somewhat greater than the maximum rated load current.

In charging a battery, if an overload condition is severe enough to cause current cutback after the current limiting point has been reached, this reduced current condition in the charging circuit greatly increases the time required to again fully charge the battery. It is therefore desirable to provide circuit means whereby this detrimental cutback of current is prevented.

Accordingly another object of the invention is to provide circuitry which maintains its output current constant as the load and battery current requirements increase beyond the current limit point thus preventing the output current from cutting back toward zero as would otherwise occur under discharged battery conditions. This is accomplished in the present embodiment by the provision of a network which is constant voltage in nature in that it is insensitive to voltage reduction in the circuit when current limiting is attained.

Another object of the invention is to provide improved charging circuitry whereby a peak voltage value in excess of the float voltage may be applied to a battery in such a manner that detrimental effects on the battery do not occur even though the installation is unattended.

Another object of the invention is to provide battery charging circuitry in which the output voltage is determined by a voltage peaking circuit section or full charge voltage means and by a current limiting circuit section.

It is a more specific object of my invention to provide for a battery charger, a voltage peaking circuit section or full charge voltage means and a current limiting circuit section which coact to control a voltage regulating circuit section or voltage control means in such a manner that during the charging cycle of a battery its terminal voltage is brought up to an over-voltage value in order to attain maximum ampere hour capacity charge on the battery.

It is well known that under certain conditions, as for example low temperature, some types of batteries will not become fully charged if charged at more than a predetermined rate while some other types may be subject to damage if charged too fast. Thus it will be seen that where a battery and a load connected thereacross are supplied with current from a regulator circuit under a current limiting condition, the battery might be charged at an excessive rate if the load is light and draws only a small amount of current.

Accordingly, it is an object of the invention to provide regulator circuitry in which the charging current supplied to a battery will not exceed a selectable predetermined value.

It is another object of the invention to provide regulator circuitry in which a current limiting circuit section is controlled only by current being supplied to charge a battery and is not affected by current being supplied to a load from the regulator circuit.

Still another object of the invention is to provide full charge regulator circuitry including a current-limiting circuit section adapted to be controlled by the charging current in the absence of current flow to the load, the load current when the battery is not being charged, and the coaction of the load current and charging current at other times.

It is a further object of the invention to provide full charge regulator circuitry in which operation of a current-limiting circuit section is brought about by either the charging current or the load current, independently of each other, whereby load current never exceeds a predetermined safe value and charging current never exceeds a selectable predetermined value which may be much less than the maximum safe load current.

Another object of the invention is to provide a full charge regulator circuit which will not supply more than a predetermined current to a battery and which includes a reference circuit connected in a manner as to make the full charge regulator circuitry very stable after a charging operation when the battery has discharged to float voltage value or below.

Figure 2:
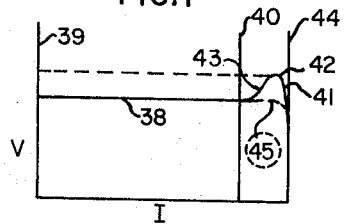
Figure 3:
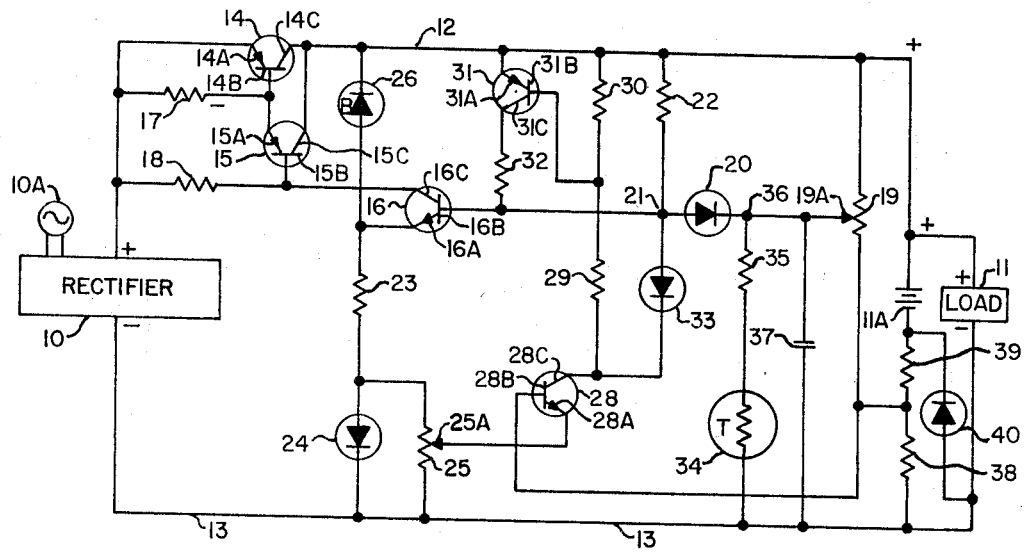
Figure 4:
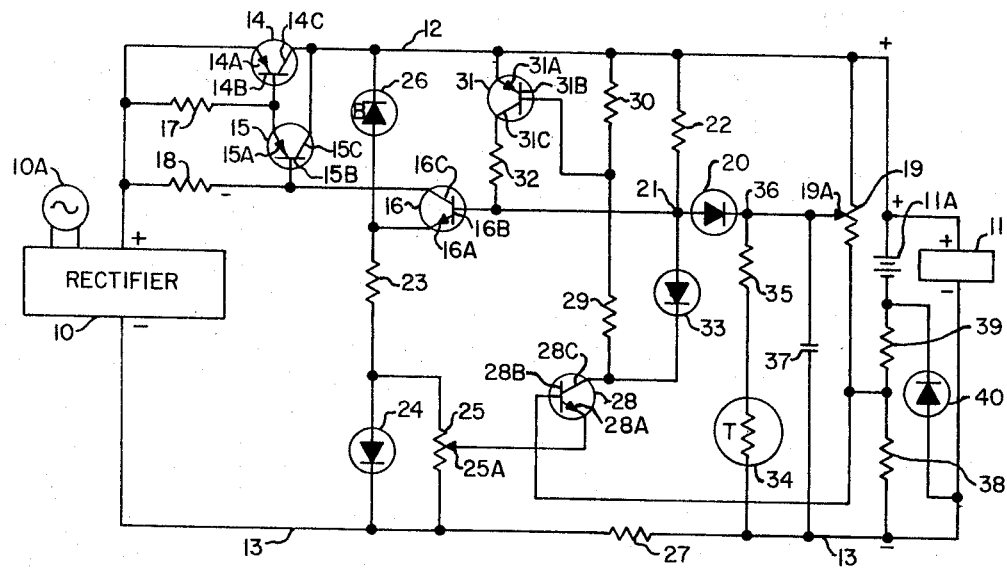
Figure 5:
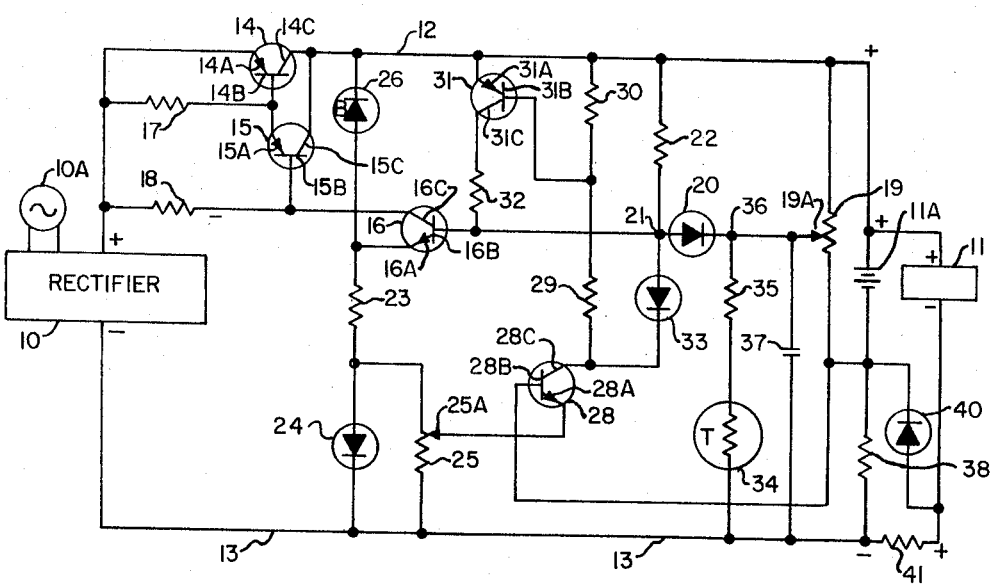
Figure 6:
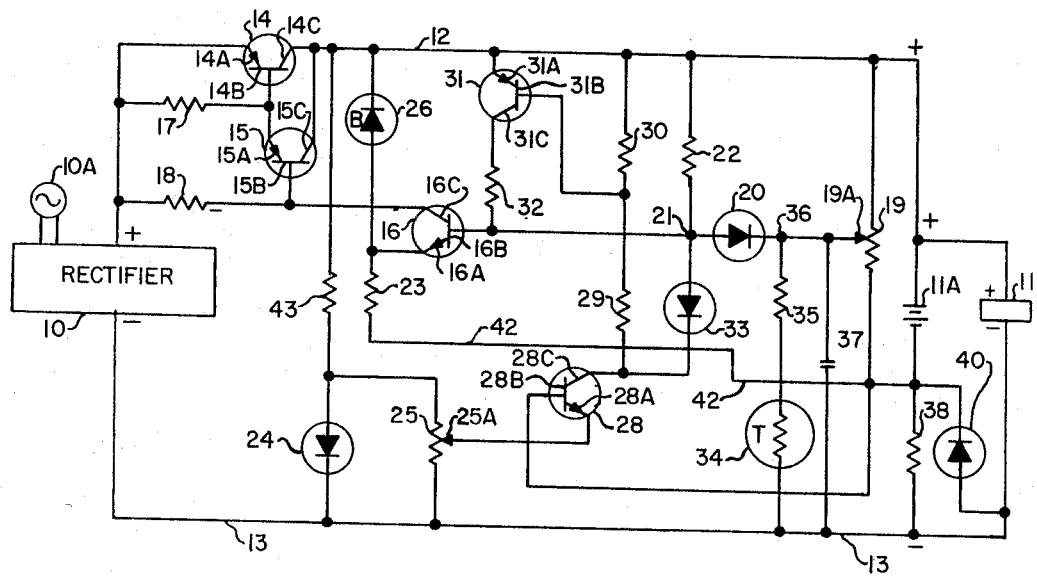

Other objects and advantages of the invention will become apparent from the following description and accompanying drawings in which:

FIGURE 1 is a schematic diagram of circuitry embodying the invention,

FIGURE 2 is the output voltage regulation curve showing characteristics of regulator circuitry of FIGURE 1, FIGURE 3 is a drawing showing the circuitry embodying the invention modified with respect to the current-limiting circuit, FIGURE 4 is a schematic drawing showing the circuitry embodying the invention modified further with respect to the current-limiting circuit section, FIGURE 5 is a drawing of circuitry embodying the invention with additional modification to the current-limiting circuit section and, FIGURE 6 shows a modification of the circuit with respect to the reference circuit.

Referring to FIGURE 1, it will be seen that a charger incorporating circuitry of the invention includes a rectifier 10 which may have a filtered D.-C. output supplied to a load 11 across which there is connected a battery 11a serving as a source of reserve power. Input power for the rectifier 10 is supplied from an alternating current source 10a such as a commercial A.-C. power line. A lead 12 provides a path for current flowing from rectifier 10 to the load 11 and battery 11a while a current return path is furnished by a lead 13.

In order to control the voltage applied to the load 11 and the battery 11a, the emitter-collector path of a PNP transistor 14 which serves as a variable resistance is inserted serially in lead 12. The conduction of transistor 14 is controlled by a PNP transistor 15 which is, in turn, controlled by an NPN transistor 16. This last named transistor serves as a voltage control means. As will be seen presently, transistors 14, 15 and 16 are included in an amplifier which functions as a voltage regulating circuit section or voltage control means in the circuit of the invention.

It will be understood that NPN type transistors may be substituted for PNP types and PNP types can be used to replace NPN types in the circuitry of this invention if the output polarity of the rectifier is reversed.

Emitter-base voltage to control the conduction of transistor 14 is provided by a resistor 17 connected between the positive output of the rectifier 10 and the base electrode 14b which is connected to emitter electrode 15a of transistor 15. Similarly, the emitter-base voltage for transistor 15 is developed by a resistor 18 which is connected from the positive side of rectifier 10 to the base electrode 15b of that transistor and to the collector electrode 16c of transistor 16.

In order that the conduction of transistor 16 will be controlled in accordance with any slight change in voltage being delivered to the battery and load, whether the change is due to the varying current requirement of the load and battery or to variation in the D.-C. output of rectifier 10, a voltage divider shown as a potentiometer 19 having a wiper arm 19a is connected between leads 12 and 13 as shown and may be termed an output voltage responsive means. The wiper arm 19a of potentiometer 19 is connected through a diode 20 and a resistor 22 to lead 12. A junction point 21 between diode 20 and resistor 22 is connected to base electrode 16b of transistor 16.

To the end that emitter electrode 16a of transistor 16 will be maintained at a constant potential to serve as a standard to which the potential appearing between base electrode 16b and lead 13 may be compared, the emitter electrode 16a is connected to lead 13 through a resistor 23 and a diode 24 which is paralleled by a potentiometer 25. Emitter electrode 16a is also connected to lead 12 through a zener diode 26. The diode 24 must be chosen so that the voltage thereacross remains substantially constant in spite of the changing current through diode 24 due to the variation in conduction of transistor 16. As will be explained presently, diode 24 provides a constant voltage for the current limiting circuit to prevent current cutback after current limiting action has taken place.

With the circuitry thus far described, the voltage supplied to load 11 and battery 11a, will be maintained constant in spite of varying load conditions or changing rectifier output voltage. If, for example, the voltage applied to battery 11a and load 11 increases slightly, current flow from lead 12 through resistor 22, diode 20 and the lower portion of potentiometer 19, toward lead 13 will increase causing junction point 21 and therefore the base 16b of transistor 16 to become more negative. The foregoing action reduces the conduction of transistor 16 and, in turn, the conduction of transistors 15 and 14 to thereby lower the output voltage and maintain that voltage at a constant value. If the voltage applied to load 11 and battery 11a decreases slightly, current through transistor 22 will decrease and junction point 21 and base electrode 16b of transistor 16 will become more positive thus increasing the conduction of transistors 16, 15 and 14 thereby preventing the voltage applied to load 11 and battery 11a from decreasing.

The voltage regulating action of transistors 14, 15 and 16 described above is shown at 38 in FIGURE 2. This float voltage represented at 38 is maintained at a constant value while the output current is between zero as shown at 39 and rated value as shown at 40.

Though the current limiting circuit section and the voltage peaking circuit section to be described presently are normally inactive until the battery 11a for some reason becomes discharged, the circuitry will be considered, for purposes of explanation, as output current increases from zero to a current limiting value and without battery 11a being connected in the circuit.

To the end that an over-voltage having a maximum value as shown at 42 in FIGURE 2 will be produced when the output current becomes slightly greater than the rated value as shown at 40, there is provided a current limiting circuit section. This section includes a resistor 27 which serves as an output current responsive means, and an NPN transistor 28 having its emitter electrode 28a connected to wiper arm 25a of potentiometer 25, its base electrode 28b connected to the resistor 27 and its collector electrode 28c connected through resistors 29 and 30 to lead 12. This current-limiting circuit section controls a voltage peaking circuit section which includes a PNP transistor 31 having an emitter electrode 31a connected to the lead 12, a base electrode 31b connected to a common point between resistors 29 and 30 and the collector electrode 31c connected to the base electrode 16b of transistor 16 through a resistor 32.

A diode 33 connected between junction 21 and the collector electrode 28c of transistor 28 is normally blocking but permits current flow from junction 21 through the collector-emitter path of transistor 28 after the maximum value 42 of the over-voltage, as shown in FIGURE 2, is attained.

When the output current reaches the rated value as shown at 40, the sum of the voltages across resistor 27 and the lower portion of potentiometer 25 is sufficient to render transistor 28 conducting due to the setting of wiper arm 25a. This causes current to flow from lead 12 through the resistors 30 and 29, the collector-emitter path of transistor 28 and the lower portion of potentiometer 25 to lead 13. As output current continues to increase, the voltage across resistor 27 and the conduction of the collector-emitter path of transistor 28 will continue to increase thereby increasing the voltage across resistor 30. When the voltage on resistor 30 becomes sufficiently great to forward bias transistor 31, current will flow from lead 12 through the emitter-collector path of transistor 31 and through resistor 32 to the base of transistor 16. A further increase in output current will cause greater conduction of transistor 28 and a corresponding rise of conduction in transistor 31. The increasing conduction of transistor 31 changes the voltage of the base electrode 16b of transistor 16 closer to that of lead 12 with the result that transistors 16, 15 and 14 increase in conduction causing the voltage applied to the load to increase as shown at 43 in FIGURE 2.

As output current continues to increase, the conduction of transistor 31 will rise until it saturates and resistor 32 is, in effect, paralleled with resistor 22 and the upper portion of potentiometer 19. At this point the over-voltage is at its maximum value since the conduction of transistor 16 can no longer increase. The potential between base 16b and lead 12 is, under these conditions, controlled by resistors 32, 22 and the upper part of potentiometer 19 because of the saturated condition of transistor 31.

As the output current continues to increase after transistor 31 has saturated, diode 33 will begin to conduct thereby permitting current to flow from lead 12 through resistor 22, diode 33, the collector-emitter path of transistor 28 and the lower portion of potentiometer 25, to lead 13. It will be seen that after diode 33 begins to conduct, any increase in the conduction of transistor 28 will change the potential of junction point 21 and the base electrode 16b of transistor 16 electrically closer to the negative potential on lead 13 at the right end of resistor 27 as shown in FIGURE 1.

The foregoing activity of transistor 28 and diode 33 reduces the conduction of transistor 16 and consequently of transistors 15 and 14 thereby reducing the voltage applied to load 11, as shown at 41 in FIGURE 2, when the output current increases subsequent to the saturation of transistor 31. If load 11 requires still greater current, the conduction of transistor 28 will increase further to further decrease the conduction of transistors 16, 15 and 14 causing sharp reduction of the voltage applied to load 11. The circuit is now in a fully current-limiting state wherein the current supplied to load 11 will not exceed a value represented by vertical 44 in FIGURE 2 regardless of how much current is required by the load.

In order to minimize the time required to charge a battery, the output current of a circuit embodying the invention is not permitted to cut back or decrease under extreme overload conditions as would be the case if the above described current limiting section were affected by the change in voltage between leads 12 and 13 after this current limiting action has taken place.

To the end that this current cutback will be prevented under overload conditions, the diode 24, paralleled by potentiometer 25, is connected between resistor 23 and lead 13. The diode 24 is so chosen that its voltage remains relatively constant over the range of current variation produced in it by changes in conduction of transistor 16. The diode 24 thus prevents the voltage on potentiometer 25 from varying in accordance with changes in voltage between leads 12 and 13 as reflected in the regulating changes in conduction of transistors 16, 15 and 14.

For purposes of clarity, the operation of circuitry embodying this invention has been described thus far with respect to increasing current requirements for load 11 and without battery 11a being connected. If the battery 11a, is now connected across load 11 in a discharged condition, the conditions imposed on the circuit will be those which occur in the circuit immediately after a power failure during which the battery has supplied the load. At the current-limiting state, as described above, the output voltage supplied to the load 11 and the battery 11a drops to the terminal voltage of the battery. At this time the difference in current between the current-limit value, as represented by the vertical 44 in FIGURE 2, and the current required by load 11 is supplied to the battery. As the battery charges, its terminal voltage rises along vertical 44 and as less charging current is required the battery voltage rises and the conduction of transistor 28 will decrease. The resulting increase in the conduction of transistors 16, 15 and 14, causes the voltage delivered to the battery to follow a curve as shown at 41 in FIGURE 2. Dashed curve 45 in FIGURE 2 shows the path along which the battery voltage rises when charged by circuitry not utilizing the present invention.

When the terminal voltage of the battery attains the peak voltage value shown at 42 in FIGURE 2, the charging circuit will cease to supply current and therefore the battery will begin discharging through the load 11. This cessation of current occurs because the battery voltage tends to increase above the peak voltage value due to the current still being supplied to the battery when the voltage across it reaches the peak voltage value. Because of this inclination, current tends to flow from the battery to the charging circuitry and therefore, the output current of the charging circuitry drops to zero. As the battery voltage declines to its normal float voltage level, the charging circuitry will again begin to supply current as required by load 11 and, in addition, a trickle current to maintain battery 11a in a fully charged condition.

During the time in which battery 11a is allowed to discharge to float voltage value after having attained peak voltage value, its ampere hour capacity is slightly reduced because of the current which it must supply to the load 11 while the charging circuitry is inoperative. However, the ampere hour capacity lost is a small fraction of the extra ampere hour capacity provided in the battery by the peak value voltage supplied in the present circuit.

In order to provide temperature compensation and supply a higher voltage at lower temperature from circuitry embodying the invention, a thermistor 34 and a resistor 35 may be serially connected between a junction 36 and lead 13 as shown. A capacitor 37 may be connected from wiper arm 19a of potentiometer 19 to lead 13 and serves to suppress any transient voltage which might adversely affect the output voltage of the charging circuitry.

From the foregoing description it will be seen that circuitry embodying the invention maintains the voltage supplied to a battery from a charger at a constant value under normal output current conditions and also provides a constant current value which will not be exceeded regardless of the combined current requirements of the load and battery. In addition, the circuitry applies a higher than float voltage to the battery during a portion of the charging cycle thus insuring that the battery will be charged to its maximum ampere hour capacity.

In the circuit of FIGURE 1, the current-limiting action is a function of the output current, that is, the sum of the load current and the battery charging current. Thus, under a current-limiting condition the magnitude of current supplied to charge the battery is the constant current-limiting value of the circuit less the load current. It will be seen that if the load requirement varies while the circuit is in a current-limiting state the amount of charging current for the battery will vary accordingly.

To the end that the charging current supplied to the battery will not exceed a selectable predetermined value the modification of the regulator circuitry shown in FIGURE 3 is provided. The regulator circuit shown in FIGURE 3 is, in many respects, similar to that of FIGURE 2 and like parts have like numerals. In the embodiment of FIGURE 3, resistor 27 has been removed from the lead 13 and a resistor 38 is serially connected with a stabilizing resistor 39 between the battery 11a and lead 13 as shown. The resistor 39 stabilizes the circuit in that it prevents switching between the floating and the charging modes of operation after a charging operation when the battery voltage has dropped from the full charge peak value to slightly less than float value. The resistor 38 is effectively connected, with the lower portion of potentiometer 25, between base electrode 28b and emitter electrode 28a of transistor 28.

With this arrangement the voltage developed on resistor 38 to control the current limiting circuit section is a function of the charging current and is not affected by load current. Hence, when the voltage on the resistor 38 is great enough to forward bias transistor 28, current limiting will occur and the charging current will not exceed a predetermined magnitude as selected by the wiper arm 25a of potentiometer 25. It will be understood that with the circuit shown in FIGURE 3, resistor 38 must be chosen appropriately to the maximum charging current desired. The resistor 38 serves as a charging current responsive means.

Referring again to FIGURE 3, it will be seen that the lower end of potentiometer 19 is connected to the lower end of the resistor 39 rather than to lead 13. Thus, the potentiometer 19 is connected across the battery 11a and resistor 39 and functions as a battery voltage responsive means in order that the battery voltage may be sensed and controlled by the regulator circuit.

In the embodiment shown in FIGURE 3 the voltage load 11 is not as closely regulated as that in FIGURE 1 due to the presence of the resistors 38 and 39. However, the voltage of load 11 differs from the closely regulated voltage applied to the battery 11a only by the magnitude of voltage appearing across the resistors 38 and 39. This voltage is relatively small when the battery is being charged, since the charging current for the battery is small in comparison to the current drawn by the load. When the battery is fully charged, it draws only a trickle current which develops insignificant voltage across resistors 38 and 39 and therefore, the voltage across load 11 will be approximately equal to the well regulated voltage of the battery under a floating condition.

In order to prevent voltage and power losses in resistors 38 and 39 when current is being supplied to load 11 by the battery 11a, as for example during a failure of the commercial A.-C. power, a diode 40 is connected between the negative side of the load 11 and the negative side of battery 11a. This diode provides a low resistance path for current flow from the positive side of the battery 11a, through the load 11 and the diode 40 to the negative side of the battery. However, the diode 40 blocks current flow from the negative side of the battery to the negative side of the rectifier 10 when battery 11a is being charged so that all charging current must flow through resistors 38 and 39. The voltage developed on resistor 38 by the charging current, as explained previously, controls the current-limiting circuit section.

The modification of the circuit shown in FIGURE 4 is very much like that of FIGURE 3 and like parts are identified by like numerals. However, in FIGURE 4 a resistor 27 is connected in the lead 13 as it was in FIGURE 1.

In this modification, the lower portion of potentiometer 25, resistor 27 and resistor 38 are serially connected between the emitter electrode 28a and the base electrode 28b of transistor 28. Thus, it will be seen that the conduction of transistor 28 will be controlled by the voltage developed on resistor 38 by charging current, plus the voltage produced on resistor 27 by the combined load and charging current, plus the voltage on the lower portion of potentiometer 25.

With the foregoing arrangement, current limiting action produced by charging current alone occurs at a lower magnitude of current than current limiting action caused by the total output current of the circuit. Thus, when the load draws little or no current, the charging current supplied to the battery will be substantially less than the current which the circuit can safely deliver. This prevents the battery from charging at an excessive rate.

The modification shown in FIGURE 5 is in many respects similar to the circuit of FIGURE 3 and like parts are identified by like numerals.

In the circuit of FIGURE 5, a resistor 41 is inserted in lead 13 to the right of resistor 38 and serves as load current responsive means. Now, the diode 40, in addition to serving as a low resistance path for battery discharge current, permits the potential appearing at the right end of resistor 27 to be applied to the base of transistor 28.

With the foregoing arrangement, the regulator circuitry is protected from damage due to overload conditions. Furthermore, the charging current for the battery 11a may be restricted to less than a selectable predetermined magnitude.

Assuming that no current is being drawn by the load 11 and that battery 11a is discharged, a voltage will be developed across resistor 38 by charging current. When this voltage becomes great enough to forward bias transistor 28, current limiting action will take place and the voltage applied to the battery will be decreased sufficiently to prevent the charging current from exceeding a predetermined value. This predetermined value is selected by the setting of wiper arm 25a.

On the other hand, if the battery is fully charged and draws no current, the increasing positive potential at the right end of resistor 41, when load current increases, will be applied to base 28b of transistor 28 through diode 40. When the voltage across resistor 41 and diode 40 becomes great enough to forward bias transistor 28 the previously described current limiting action will occur.

Where both the load 11 and the battery 11a are drawing current, it will be seen that whichever voltage tends to be the greater, that across resistor 41 and diode 40 or that of resistor 38 will control the current limiting circuit section. Thus, with the circuit of FIGURE 5 the charging current will not exceed a selectable predetermined maximum value as determined by the setting of wiper arm 25a and the value of resistor 38. Also, the load current will not exceed a predetermined value which may, if desired, be different from the predetermined maximum value of the charging current. The magnitude of load current at which current limiting will occur is controlled by the setting of wiper arm 25a (the value of resistor 41 and the characteristics of diode 40.

The modification of the circuit shown in FIGURE 6 is very similar to the modification of FIGURE 3. In FIGURE 6, resistor 23 is connected to the lower end of potentiometer 19 by means of a lead 42 rather than to the diode 24. It will be seen that the resistor 23 and the zener diode 26 are now serially connected across the battry 11a and in parallel with potentiometer 19. With resistor 23 connected in the above described manner, the circuit is very stable and the stabilizing resistor 39 shown in FIGURE 3 is not used.

Because in the modification of FIGURE 6 resistor 23 has been disconnected from the diode 24, a new source of current must be provided for that diode. This may be done by connecting the diode 24 to lead 13 through a resistor 43. The voltage across the diode 24 will be relatively constant, as explained previously, to prevent current cutback after current limiting occurs. If desired, the modification shown in FIGURE 6 may be incorporated into the other circuits described herein.

It will be understood that the embodiments shown herein are for explanatory purposes and may be changed or modified without departing from the spirit and scope of the invention as set forth in the claims appended hereto.

What we claim is:

1. In a voltage regulator circuit having output terminals and adapted to control the voltage and current delivered to a battery from a D.-C. source, in combination, voltage control means, current limiting means, variable conducting means having power electrodes and a control electrode, first voltage divider means connected between the output terminals, means for connecting one of said power electrodes of said variable conducting means to said first voltage divider means and to said voltage control means, means for connecting another of said power electrodes of said variable conducting means to one of said output terminals, second voltage divider means connected from one of said output terminals to said current limiting means, means for connecting the control electrode of said variable conducting means to said second voltage divider means.

2. In a circuit adapted for connection between a D.-C. source and a battery, the combination of first variable conducting means having first and second power electrode means and control electrode means, second variable conducting means having first and second power electrode means and control electrode means, constant voltage means, output voltage responsive means, means for connecting said first power electrode means of said first variable conducting means to said constant voltage means, means for connecting said second power electrode means of said first variable conducting means to said control electrode of said second variable conducting means, means for connecting said first and second power electrode means of said second variable conducting means between the rectifier and the battery, means for connecting said control electrode means of said first variable conductnig means to said output voltage responsive means, current limiting means, voltage peaking means, means for connecting said current limiting means to said control electrode means of said first variable conducting means, means for connecting said current limiting means to said voltage peaking means, means for connecting said voltage peaking means to said control electrode means of said first variable conducting means.

3. In a circuit adapted for connection between a D.-C. source and a battery, the combination of voltage control means, variable conducting means having first and second power electrode means and control electrode means, voltage peaking means, means for connecting said full charge voltage means to said voltage control means, output current responsive means, constant voltage means, means for connecting said output current responsive means and said constant voltage means serially between said control electrode means and said first power electrode means of said variable conducting means, means for connecting said second power electrode means of said variable conducting means to said full charge voltage means, means for connecting said second power electrode means of said variable conducting means to said voltage control means.

4. In a circuit having output terminals and adapted to control the voltage and current supplied by a D.-C. current source to a battery and a load, in combination, voltage control means, current limiting means including a first variable conducting means having first and second power electrode means and control electrode means, constant voltage means, output current responsive means, means for connecting said constant voltage means and said output current responsive means serially between said control electrode means and said first power electrode means of said first variable conducting means, undirectional current means and first resistive means serially connected between said second power electrode of said first variable conducting means and one of said output terminals, means for connecting said voltage control means to a point between said first resistive means and said undirectional current means, output voltage responsive means, means for connecting said voltage control means to said output voltage responsive means, full charge voltage means including second resistive means and second variable conducting means having first and second power electrode means and control electrode means, means for connecting said first power electrode means of said second variable conducting means to said one of said output terminals, means for connecting said second power electrode means of said second variable conducting means to said common point between said first resistive means and said unidirectional current means through said second resistive means, voltage divider means connected between said second power electrode means of said first variable conducting means and said one of said output terminals, means for connecting said control electrode means of said second variable conducting means to said voltage divider means.

5. In a circuit having output terminals and adapted to control the voltage and current supplied by a D.-C. power supply to a battery and load, in combination, voltage control means including variable resistance means having a resistance determining element, first variable conducting means having first and second power electrode means and control electrode means, current limiting means, full charge voltage means including fixed resistance means and second variable conducting means having first and second power electrode means and control electrode means, means for connecting said variable resistance means between the D.-C. power supply and the battery, means for connecting said resistance determining element of said variable resistance means to said second power electrode means of said first variable conducting means, constant voltage means, means for connecting said first power electrode of said first variable conducting means to said constant voltage means, output voltage responsive means, means for connecting said control electrode means of said first variable conducting means to said output voltage responsive means, means for connecting said fixed resistance means serially with said first and second power electrode means of said second variable conducting means between one of said output terminals and said control electrode means of said first variable conducting means, means for connecting said current limiting means to said control electrode means of said first variable conducting means, means for connecting said current limiting means to said control electrode means of said second variable conducting means.

6. In a circuit having output terminals and adapted to control the voltage and current supplied to a battery and a load by a D.-C. power supply, in combination, voltage control means including variable resistance means having a resistance determining element, first variable conducting means having first and second power electrode means and control electrode means, current limiting means including a second variable conducting means having first and second power electrode means and control electrode means, means for connecting said variable resistance means between the D.-C. power supply and the battery, means for connecting said resistance determining element of said variable resistance means to said second power electrode means of said first variable conducting means, first constant voltage means, means for connecting said first power electrode of said first variable conducting means to said first constant voltage means, output voltage responsive means, means for connecting said control electrode means of said first variable conducting means to said output voltage responsive means, second constant voltage means, output current responsive means, means for connecting said second constant voltage means and said output current responsive means serially between said control electrode means and said first power electrode means of said second variable conducting means, full charge voltage means, means for connecting said second power electrode means of said second variable conducting means to said full charge voltage means, means for connecting said full charge voltage means to said control electrode means of said first variable conducting means.

7. In a circuit having output terminals and adapted to control the voltage and current supplied by a D.-C. power supply to a battery and a load, in combination, voltage control means including first and second variable conducting means each having first and second power electrode means and a control electrode means, means for connecting said first electrode means of said first variable conducting means to said D.-C. source, means for connecting said second power electrode means of said first variable conducting means to one of said output terminals, means for connecting said control electrode means of said first variable conducting means to said second power electrode means of said second variable conducting means, first constant voltage means connected to said first power electrode means of said second variable conducting means, a voltage divider connected between said output terminals, first unidirectional conducting means connected between said control electrode of said second variable conducting means and said voltage divider, third variable conducting means having first and second power electrode means and control electrode means, second constant voltage means and output current responsive means serially connected between said control electrode means and said first power electrode means of said third variable conducting means, second unidirectional conducting means connected between said second power electrode means of said third variable conducting means and said control electrode means of said second variable conducting means, a first resistor connected between said control electrode means of said second variable conducting means and one of said output terminals, a voltage divider connected between said second power electrode means of said third variable conducting means and one of said output terminals, a second resistor, fourth variable conducting means having a first power electrode means connected to one of said output terminals, a second power electrode means connected to said control electrode means of said second variable conducting means through said second resistor and control electrode means connected to said voltage divider.

8. In a circuit having output terminals and adapted to control the voltage and current supplied by a D.-C. power supply to a battery, in combination, voltage control means, current limiting means, output voltage responsive means, first unidirectional conducting means connected between said output voltage responsive means and said voltage control means, a resistor connected between one of said output terminals and said voltage control means, a second unidirectional conducting means connected between said voltage control means and said current limiting means, a voltage divider connected between said current limiting means and one of said output terminals, voltage peaking means connected between said voltage control means and said one of said output terminals, means for connecting said voltage peaking means to said voltage divider.

9. In a circuit adapted to control the voltage and current supplied from a D.-C. source to a battery, the combination of voltage control means, variable conducting means having first and second power electrode means and control electrode means, full charge voltage means operatively associated with said voltage control means, charging current responsive means, constant voltage means, means for connecting said charging current responsive means and said constant voltage means serially between said control electrode means and said first power electrode means of said variable conducting means, means for connecting said second power electrode means of said variable conducting means to said full charge voltage means, means for connecting said second power electrode means of said variable conducting means to said voltage control means, unidirectional conducting means connected in parallel with said charging current responsive means, stabilizing resistive means connected between said charging current responsive means and the battery.

10. In a circuit having output terminals and adapted to control the voltage and current supplied to a battery and an associated load from a D.-C. power supply, the combination of voltage control means including variable resistance means having a resistance determining element, first variable conducting means having first and second power electrode means, current limiting means including a second variable conducting means having first and second power electrode means and control electrode means, means for connecting said variable resistance means between the D.-C. power supply and the battery, means for connecting said resistance determining element of said variable resistance means to said second power electrode means of said first variable conducting means, first constant voltage means, means for connecting said first power electrode of said first variable conducting means to said first constant voltage means, battery voltage responsive means, means for connecting said control electrode means of said first variable conducting means to said battery voltage responsive means, second constant voltage means, charging current responsive means, means for connecting said second constant voltage means and said charging current responsive means serially between said control electrode means and said first power electrode means of said second variable conducting means, full charge voltage means, means for connecting said second power electrode means of said second variable conducting means to said full charge voltage means, means for connecting said full charge voltage means to said control electrode means of said first variable conducting means, unidirectional conducting means connected in parallel with said charging current responsive means, stabilizing resistive means connected between said charging current responsive means and the battery.

11. In a circuit adapted to supply controlled voltage and current to a battery having an associated load, the combination of voltage control means, variable conducting means having first and second power electrode means and control electrode means, full charge voltage means operatively associated with said voltage control means, charging current responsive means, output current responsive means, constant voltage means, means for connecting said charging current responsive means, said output current responsive means and said constant voltage means serially between said control electrode means and said first power electrode means of said variable conducting means, means for connecting said second power electrode means of said variable conducting means to said full charge voltage means, means for connecting said second power electrode means of said variable conducting means to said voltage control means, unidirectional conducting means connected in parallel with said charging current responsive means.

12. In a circuit adapted to supply controlled voltage and current to a battery having an associated load, the combination of voltage control means, variable conducting means having first and second power electrode means and control electrode means, full charge voltage means operatively associated with said voltage control means, charging current responsive means, constant voltage means, means for connecting said charging current responsive means and said constant voltage means serially between said control electrode means and said first power electrode means of said variable conducting means, load current responsive means connected from the load to a point between said constant voltage means and said charging current responsive means, means for connecting said second power electrode means of said variable conducting means to said full charge voltage means, means for connecting said second power electrode means of said variable conducting means to said voltage control means, unidirectional conducting means connected between the load side of said load current responsive means and the battery side of said charging current responsive means.

13. In a circuit adapted for connection between a D.-C. source and a battery, the combination of voltage control means, a Zener diode and a first resistor serially connected across the battery, means for connecting said voltage control means to a point between said Zener diode and said first resistor, full charge voltage means operatively associated with said voltage control means, variable conducting means having first and second power electrodes and a control electrode, charging current responsive means, constant voltage means and a second resistor serially connected across the load, means for connecting said charging current responsive means and said constant voltage means serially between said control electrode and said first power electrode of said variable conducting means, means for connecting said second power electrode means of said variable conducting means to said full charge voltage means, means for connecting said second power electrode means of said variable conducting means to said voltage control means, a unidirectional conducting device connected in parallel with said charging current responsive means.

References Cited by the Examiner
UNITED STATES PATENTS

| | | | |
|---|---|---|---|
| 2,994,029 | 7/1961 | Bixby | 307—66 |
| 3,123,759 | 3/1964 | Grey | 320—40 |
| 3,179,871 | 4/1965 | Bagno | 323—22 X |

ORIS L. RADER, *Primary Examiner.*

T. J. MADDEN, *Assistant Examiner.*